UNITED STATES PATENT OFFICE.

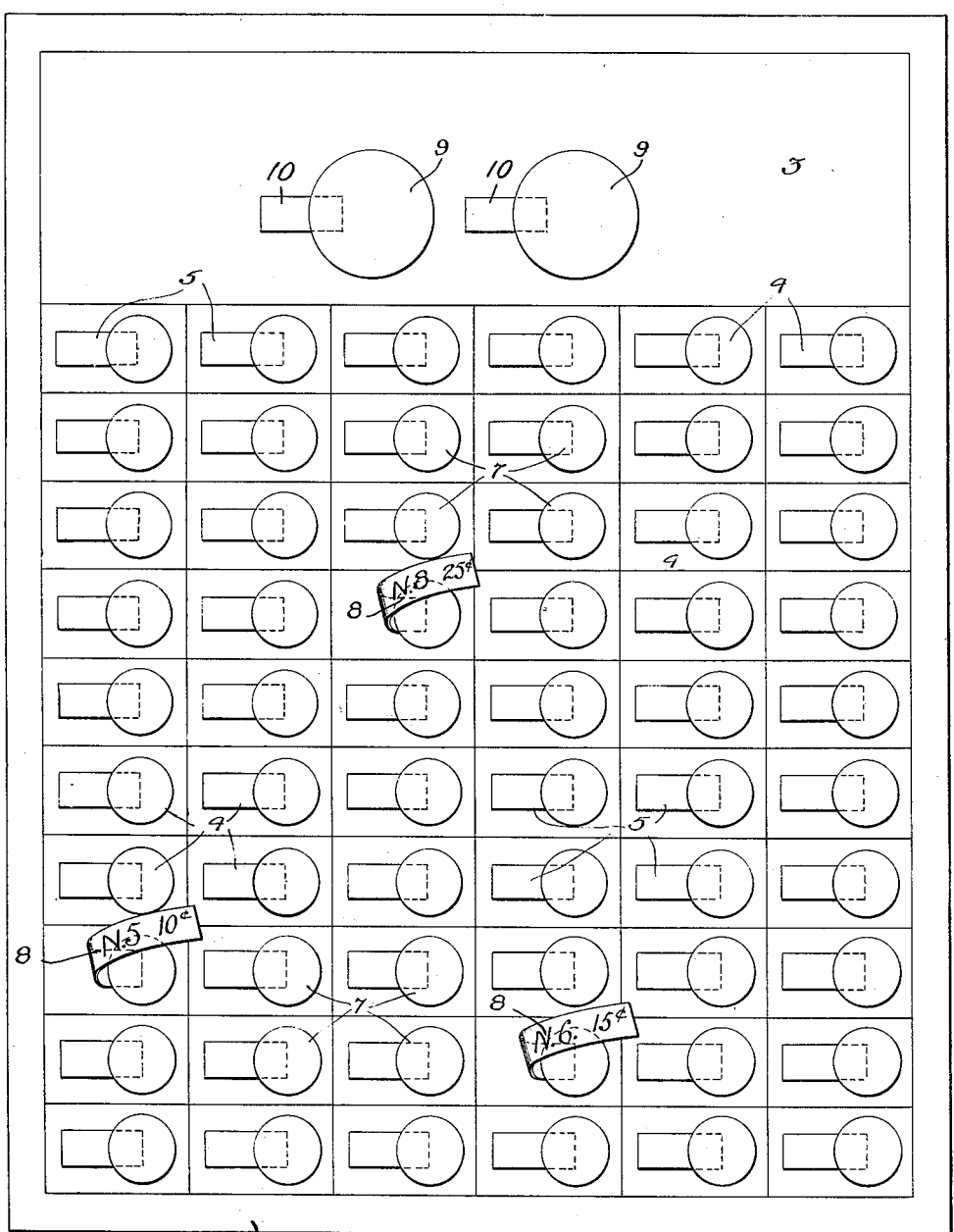

GIOCOMO ALLEGRETTI, OF CHICAGO, ILLINOIS.

COUPON-CARD.

1,011,706.  Specification of Letters Patent.  Patented Dec. 12, 1911.

Application filed November 19, 1909. Serial No. 528,960.

*To all whom it may concern:*

Be it known that I, GIOCOMO ALLEGRETTI, a citizen of the United States, residing at Chicago, in the county of Cook and State of Illinois, have invented certain new and useful Improvements in Coupon-Cards, of which the following is a specification.

The coupon card of the present invention relates to that type which has placed thereon a plurality of coupons intended to be sold to the purchaser for a certain price, each one of which entitles the purchaser thereof to an amount of merchandise equal to the purchase price of the coupon, and certain of the coupons entitle the purchaser to a premium in addition to the amount of merchandise given in return for the purchase of the coupon, the coupons which entitle the purchaser to a premium being determined by means of auxiliary coupons. By means of these premiums, trade is stimulated and the daily amount of sales increased.

The object of the present invention is to so position the coupons upon the card that in tearing them off, the designating mark upon the coupon will not become defaced. And the invention further consists in the features of construction and combination of parts hereinafter described and claimed.

In certain prior constructions of devices of the class to which the present invention relates, the coupons have been attached to the card in a manner to bring the designating marks on the coupons in contact with the face of the card board forming the body portion of the card. This is objectionable for the reason that the coupon is liable to become adhered to the face of the card board through dampness, or other cause, so that in removing the coupon, the designating mark thereon will become defaced and impossible of identification, and thus destroy the efficiency of the card.

In the drawings, Figure 1 is a face view of the card, with the coupons in place thereon, some of them being turned back to display the designating mark thereon; and Fig. 2, a sectional detail showing the manner of securing the coupons in place upon the card.

A section 3 of card board, or other suitable substance, has located thereon a plurality of coupons 4, each consisting of a tag 5 in the form of a strip of flexible material 6, folded at a point approximately at the center thereof, and having its free end lying underneath a gummed seal 7, and the free end terminates, when the tag is folded, at a point approximately at the center of the seal. The tag is held in place by having its other end secured to the seal 7, which in turn is secured to the upper face of the card board. The tag has impressed, at a point adjacent the free end, designating characters consisting of a symbol in the form of a number and a price mark, and that portion of the tag bearing these marks is, when the tag is folded, positioned to lie against the secured end of the tag, whereby it is brought out of engagement with the surface of the card and the surface of the seal, the space intermediate the fixed end of the tag and the card forming in effect a pocket to secure the free end of the tag when the same is folded back. This method of attaching coupons to the card renders it impossible for the purchaser to determine the designating mark upon the coupon prior to purchasing it, renders the coupon easy of removal from the card, and places the designating mark 8 on the coupon in a position where it is not brought into contact with the face of the card board, thus preventing it from becoming attached to the surface of the card board and becoming defaced in the removal of the coupon.

Located at a suitable position upon the card are a plurality of coupons 9 similar in construction to the coupons 4, but, as shown, somewhat larger. Each of the coupons 9 has a tag 10 secured thereto in a manner similar to that heretofore described in connection with the tags 5; and each of the tags 10 has a symbol or number thereon, which are the prize numbers. The numbers on the tags 10 correspond to symbols or numbers upon the tags 5; and the purchaser or purchasers who obtain the coupons 4, which have tags bearing a symbol corresponding to the symbols upon the tags 10, will be entitled to a premium or prize, in addition to merchandise secured at the time of purchase of the coupon, which is equal in value to the purchase price of the coupon. It is understood that each of the tags 10 bears a different number and that there are a plurality of prizes corresponding in number to the number of coupons 9.

In practice the purchaser removes one of the seals 4 and pays the amount indicated on the tag attached thereto, for which payment he receives a quantity of merchandise equal to said amount. The storekeeper indicates upon this space where the seal has been, the name of that purchaser and the number of the removed coupon. This method of operation is continued until all of the seals 4 have been removed from the card. When this has been done, the seals 9 are torn off and the prize numbers upon the tags 10 revealed. Then the storekeeper, by referring to the notations on the card, can see which of the purchasers bought the tags having the same symbols as the tags 10 of the seals 9. These purchasers are entitled to a premium in addition to the amount of merchandise obtained for the price paid for the original tag. The tags are not all for a like amount, but different purchase prices are indicated on different tags throughout the board, and each tag is provided with a different designating symbol or number.

The above description of the operation of this particular form of coupon card is set forth merely to show one purpose to which the tags of the nature claimed can be utilized, and it is understood that the particular arrangement of this board, or the method of operation, does not in any way enter into the spirit of the present invention.

I claim:

A device of the class described, consisting of a section of card board and a plurality of coupons secured thereto, each coupon comprising a seal and a tag, the tag being in the form of an elongated narrow ribbon-like strip of flexible material projecting from the edge of the seal and having printed matter on its outer end, the seal being provided with a gummed surface, to which the inner end of the tag is attached, the tag extending to a point approximately at the center of the seal, the remaining portion of the gummed surface adhering to the surface of the card and serving to retain the tag in position upon the card, the space intermediate the inner end of the tag and the body of the card forming a pocket, the outer end of the tag being bent back and tucked within said pocket, whereby that portion of the tag bearing the printed matter is positioned against the surface of the inner end of the tag, preventing said printed matter from engagement with the surface of the card board, substantially as described.

GIOCOMO ALLEGRETTI.

Witnesses:
J. CONNELL,
WM. P. BOND.